(12) United States Patent
Li

(10) Patent No.: US 12,008,684 B2
(45) Date of Patent: Jun. 11, 2024

(54) IMAGE CROPPING METHOD AND APPARATUS, AND DEVICE AND STORAGE MEDIUM

(71) Applicant: Beijing Bytedance Network Technology Co., Ltd., Beijing (CN)

(72) Inventor: Linxing Li, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/877,711

(22) Filed: Jul. 29, 2022

(65) Prior Publication Data

US 2022/0366617 A1 Nov. 17, 2022

Related U.S. Application Data

(63) Continuation of application No. PCT/CN2021/076687, filed on Feb. 18, 2021.

(30) Foreign Application Priority Data

Feb. 24, 2020 (CN) .......................... 202010113486.5

(51) Int. Cl.
*G06T 11/00* (2006.01)
*G06F 3/04845* (2022.01)
*G06T 7/30* (2017.01)

(52) U.S. Cl.
CPC .......... *G06T 11/00* (2013.01); *G06F 3/04845* (2013.01); *G06T 7/30* (2017.01); *G06T 2200/24* (2013.01); *G06T 2210/22* (2013.01)

(58) Field of Classification Search
CPC .................................. G06T 11/00; G06T 7/30
See application file for complete search history.

(56) References Cited

U.S. PATENT DOCUMENTS 9,917,957 B1 3/2018 Martin et al.
10,101,891 B1 10/2018 Kulewski et al.
(Continued)

FOREIGN PATENT DOCUMENTS

| CN | 102646258 A | 8/2012 |
|---|---|---|
| CN | 104463780 A | 3/2015 |
| CN | 104991725 A | 10/2015 |
| CN | 105205780 A | 12/2015 |
| CN | 105989572 A | 10/2016 |

(Continued)

OTHER PUBLICATIONS

International Patent Application No. PCT/CN2021/076687; Int'l Search Report; dated May 21, 2021; 3 pages.

(Continued)

*Primary Examiner* — Yi Yang
(74) *Attorney, Agent, or Firm* — BakerHostetler

(57) ABSTRACT

Provided are an image cropping method, an image cropping device, an apparatus and storage medium. The method includes: adjusting a size of an image in a cropping area of a cropping block in a case that a border of the cropping block reaches a first target position of an image display area and a dragging event for the cropping block continues; and displaying, on a second target position of the image display area, an image in a current cropping area of the cropping block according to a current size ratio of the image in the cropping area of the cropping block when the dragging event for the cropping block ends.

17 Claims, 7 Drawing Sheets

(56) References Cited

U.S. PATENT DOCUMENTS

| | | | |
|---|---|---|---|
| 2006/0001650 A1* | 1/2006 | Robbins | G06F 3/0482 |
| | | | 345/173 |
| 2009/0023472 A1* | 1/2009 | Yoo | H04W 4/12 |
| | | | 455/415 |
| 2012/0054190 A1 | 3/2012 | Peters | |
| 2012/0139950 A1* | 6/2012 | Sogo | G06T 3/40 |
| | | | 345/661 |
| 2013/0009997 A1* | 1/2013 | Boak | G09G 5/00 |
| | | | 345/173 |
| 2013/0016122 A1 | 1/2013 | Bhatt et al. | |
| 2013/0198679 A1* | 8/2013 | Nurse | G06F 3/048 |
| | | | 715/779 |
| 2016/0139780 A1 | 5/2016 | Nurse et al. | |
| 2016/0378292 A1 | 12/2016 | Lu et al. | |

FOREIGN PATENT DOCUMENTS

| | | |
|---|---|---|
| CN | 109447072 A | 3/2019 |
| CN | 110706150 A | 1/2020 |
| CN | 111275726 A | 6/2020 |
| JP | 2004-163735 A | 6/2004 |
| JP | 2006-262287 A | 9/2006 |
| JP | 2014-059634 A | 4/2014 |
| JP | 2016-224804 A | 12/2016 |

OTHER PUBLICATIONS

"How to Quickly Hide Private Photos on your iPhone"; http://roll.sohu.com/20130609/n378466995.html; Jun. 2013; website has expired.

* cited by examiner

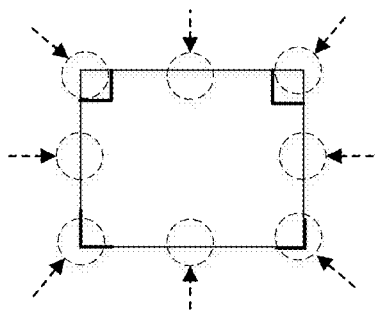

Figure 1F

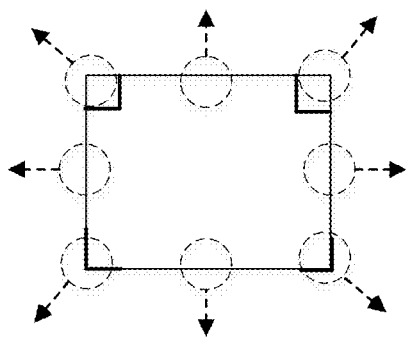

Figure 1G

| Adjust a size of an image in a cropping area of a cropping block in a case that a border of the cropping block reaches a first target position of an image display area and a dragging event for the cropping block continues | ~110 |

↓

| Display an image in a current cropping area of the cropping block on a second target position of the image display area based on a current size ratio of the image in the cropping area of the cropping block when the dragging event for the cropping block ends | ~120 |

Figure 2

IMAGE CROPPING METHOD AND APPARATUS, AND DEVICE AND STORAGE MEDIUM

CROSS REFERENCE TO RELATED APPLICATION

The present application is a continuation of International Patent Application No. PCT/CN2021/076687, filed on Feb. 18, 2021, which claims priority to Chinese Patent Application No. 202010113486.5, titled "IMAGE CROPPING METHOD AND APPARATUS, AND DEVICE AND STORAGE MEDIUM", filed on Feb. 24, 2020, both of which are incorporated herein by reference in their entireties.

TECHNICAL FIELD

Embodiments of this disclosure relates to the technical field of image processing, and in particular, to an image cropping method, an image cropping device, an apparatus and storage medium.

BACKGROUND

An image cropping function is a basic function of an image retouching software of most mobile terminals. As shown in FIG. 1A, after the image cropping function is triggered, a target image 102 and a cropping block 103 are superimposed and displayed on an image display area 101 of a display screen 100 of a mobile terminal. As shown in FIG. 1B, the image retouching software of the mobile terminal adjusts a size of the cropping block 103 in response to a dragging event of a user on a border of the cropping block 103. As shown in FIG. 1C, after the dragging event ends, a cropped image 104 is displayed in the image display area 101 based on a border ratio of the cropping block 103 when the dragging event ends, and the cropped image 104 is a part of the target image 102 within the cropping block 103 when the dragging event ends. The above-mentioned operation on the cropping block is also referred to as a hand following operation.

When the border of the cropping block 103 is dragged to the edge of the image display area 101, the current cropping ends. If a cropping effect expected by the user is not achieved, the user needs to drag the border of the cropping block 103 again in the same way, and repeat the process for several times to achieve the expected cropping effect. As a size of the cropped image approaches a size of the target image, a draggable range of the cropping block 103 becomes smaller and smaller, and an operation difficulty increases.

In addition, in the process of dragging the cropping block 103 by the user, only the size of the cropping block 103 changes accordingly, neither a position nor a size of the target image changes. For some special cropping requirements, for example, if the user wishes to preserve a screen in a central area of the image by cropping, the existing image cropping implementation may increase an operation complexity.

SUMMARY

An image cropping method, an image cropping device, an apparatus and storage medium are provided according to embodiments of the present disclosure, so as to reduce a difficulty of a cropping operation and improve an efficiency of the cropping operation.

In a first aspect, an image cropping method is provided according to an embodiment of the present disclosure. The method includes: adjusting a size of an image in a cropping area of a cropping block in a case that a border of the cropping block reaches a first target position of an image display area and a dragging event for the cropping block continues; and displaying, on a second target position of the image display area, an image in a current cropping area of the cropping block based on a current size ratio of the image in the cropping area of the cropping block when the dragging event for the cropping block ends.

In the image cropping method provided according to the embodiment of the present disclosure, when the border of the cropping block reaches the first target position of the image display area, for example, reaches a boundary of the image display area, if the cropping block is not released, that is, the dragging event for the cropping block still continues, the image cropping process may still continue, that is, in this case, a size of the image in the cropping area of the cropping block may be adjusted. Therefore, with the method provided by the embodiment of the present disclosure, when the user drags the cropping block to the boundary of the image display area, as long as the cropping block is not released, an application for implementing the method provided by the embodiment of the present disclosure may continue to adjust the size of the image to achieve continuing cropping, which can avoid a case that the user frequently drags the cropping block in the same way to achieve an expected effect. Therefore, a difficulty of an image cropping operation is reduced and an efficiency of the image cropping is improved.

Optionally, the size of the image in the cropping area of the cropping block is adjusted in a case that the border of the cropping block reaches the first target position of the image display area and the dragging event for the cropping block continues, until the dragging event for the cropping block ends or the border of the cropping block reaches a boundary of a target image. The image in the cropping area of the cropping block is a part of the target image.

It should be pointed out that the purpose of image cropping is to preserve a screen required by the user by cropping. Generally, when the border of the cropping block reaches the boundary of the target image, the screen required by the user may already appear, so there is no need to continue to adjust the size of the image. Therefore, "the border of the cropping block reaches the boundary of the target image" is preset as a stopping condition for image size adjustment. When the stopping condition is met, the image cropping is automatically stopped to improve a quality and effect of image cropping.

In any of the above method embodiments, the first target position of the image display area may be any of following positions: a boundary of the image display area, and a position of the border of the cropping block on the image display area when the border of the cropping block reaches a set minimum size.

It can be seen that, in the method provided by the embodiment of the present disclosure, when the border of the cropping block reaches the boundary of the image display area, the image cropping may still be continued. In addition, when the border of the cropping block reaches the set minimum size, the image cropping may still be continued.

On this basis, in a case that the border of the cropping block reaches the boundary of the image display area, the border of the cropping block does not coincide with the boundary of the target image when the dragging event for the cropping block starts, and the dragging event for the cropping block continues, the adjusting a size of an image in a cropping area of a cropping block includes: reducing the size of the image in the cropping area of the cropping block; in a case that the border of the cropping block reaches the boundary of the image display area, the border of the cropping block coincides with the boundary of the target image when the dragging event for the cropping block starts, and the dragging event for the cropping block continues, the adjusting a size of an image in a cropping area of a cropping block includes: increasing the size of the image in the cropping area of the cropping block; and in a case that the border of the cropping block reaches the set minimum size and the dragging event for the cropping block continues, the adjusting a size of an image in a cropping area of a cropping block includes: increasing the size of the image in the cropping area of the cropping block.

Optionally, the size of the image in the cropping area of the cropping block is reduced to make a proportion of the image displayed in the cropping area of the cropping block in the target image increase.

On the basis of any of the above method embodiments, in a case that the border of the cropping block reaches the first target position of the image display area and the dragging event for the cropping block continues, on the one hand, a display size of the image in the cropping area of the cropping block may be continuously adjusted, correspondingly, the current size ratio of the image in the cropping area of the cropping block is determined based on a current display size, in this case, in an image cropping process, the effect of image cropping can be previewed in real time, which helps to improve the efficiency of image cropping. On the other hand, a size parameter of the image in the cropping area of the cropping block may be adjusted, correspondingly, the current size ratio of the image in the cropping area of the cropping block is determined based on the size parameter when the dragging event for the cropping block ends. In this case, although the effect of image cropping cannot be previewed in real time during the image cropping process, since the size parameter of the image is recorded, a result of image cropping may be displayed accurately after the dragging event ends.

On the basis of any of the above method embodiments, an image size adjustment speed may be determined based on a parameter of the dragging event for the cropping block, and the size of the image in the cropping area of the cropping block may be adjusted based on the image size adjustment speed.

During the process of implementing the present disclosure, the inventor finds, by analyzing the user's usage habits, that some dragging habits of the user when dragging the cropping block reflect the user's expectation on the image size adjustment speed. These dragging habits may be reflected in the parameter of the dragging event. Therefore, the image size adjustment speed is determined based on the parameter of the dragging event, and a dragging operation may be controlled to conform to or be close to the user's expectation on the image size adjustment speed.

The parameter of the dragging event for the cropping block may include a dragging distance, where a greater dragging distance indicates a greater image size adjustment speed.

During the process of implementing the present disclosure, the inventor finds, by analyzing the user's usage habits, that when the user drags the cropping block, a greater dragging range, i.e., a greater dragging distance of the dragging event indicates a greater image size adjustment speed expected by the user. Therefore, determining the image size adjustment speed based on the dragging distance is in line with the user's expectation.

On the basis of any of the above method embodiments, the method provided by the embodiment of the present disclosure may further include: adjusting, when the dragging event for the cropping block continues, a display position of a target image to make a center of the target image always coincide with a center of the cropping area of the cropping block or make the center of the target image approach the center of the cropping area of the cropping block based on a specified path.

If a screen that the user expects to preserve is close to or located in a center region of the target image, during the image cropping process, if the display position of the target image remains unchanged, the border of the cropping block needs to be adjusted multiple times in multiple directions. If the display position of the target image is adjusted in the above manner, it is possible to avoid missing the screen that the user expects to preserve during the image cropping process, and the expected effect can be achieved by a few adjustments in a few number of directions, and the cropping efficiency can be improved.

In a second aspect, an image cropping device is provided according to an embodiment of the disclosure. The device includes: an image adjusting module, configured to adjust a size of an image in a cropping area of a cropping block in a case that a border of the cropping block reaches a first target position of an image display area and a dragging event for the cropping block continues; and an image displaying module, configured to display, on a second target position of the image display area, an image in a current cropping area of the cropping block based on a current size ratio of the image in the cropping area of the cropping block when the dragging event for the cropping block ends.

In the image cropping device provided according to the embodiment of the present disclosure, when the border of the cropping block reaches the first target position of the image display area, for example, reaches a boundary of the image display area, if the cropping block is not released, that is, the dragging event for the cropping block still continues, the image cropping process may still continue, that is, in this case, a size of the image in the cropping area of the cropping block may be adjusted. Therefore, with the device provided by the embodiment of the present disclosure, when the user drags the cropping block to the boundary of the image display area, as long as the cropping block is not released, an application for implementing the device provided by the embodiment of the present disclosure may continue to adjust the size of the image to achieve continuing cropping, which can avoid a case that the user frequently drags the cropping block in the same way to achieve an expected effect. Therefore, a difficulty of an image cropping operation is reduced and an efficiency of the image cropping is improved.

Optionally, the image adjusting module is configured to adjust the size of the image in the cropping area of the cropping block in a case that the border of the cropping block reaches the first target position of the image display area and the dragging event for the cropping block continues, until the dragging event for the cropping block ends or the border of the cropping block reaches a boundary of a target image. The image in the cropping area of the cropping block is a part of the target image.

It should be pointed out that the purpose of image cropping is to preserve a screen required by the user by cropping. Generally, when the border of the cropping block reaches the boundary of the target image, the screen required by the user may already appear, so there is no need to continue to adjust the size of the image. Therefore, "the border of the cropping block reaches the boundary of the target image" is preset as a stopping condition for image size adjustment. When the stopping condition is met, the image cropping is automatically stopped to improve a quality and effect of image cropping.

In any of the above device embodiments, the first target position of the image display area may be any of following positions: a boundary of the image display area, and a position of the border of the cropping block on the image display area when the border of the cropping block reaches a set minimum size.

It can be seen that, in the device provided by the embodiment of the present disclosure, when the border of the cropping block reaches the boundary of the image display area, the image cropping may still be continued. In addition, when the border of the cropping block reaches the set minimum size, the image cropping may still be continued.

On this basis, in a case that the border of the cropping block reaches the boundary of the image display area, the border of the cropping block does not coincide with the boundary of the target image when the dragging event for the cropping block starts, and the dragging event for the cropping block continues, the adjusting a size of an image in a cropping area of a cropping block includes: reducing the size of the image in the cropping area of the cropping block; in a case that the border of the cropping block reaches the boundary of the image display area, the border of the cropping block coincides with the boundary of the target image when the dragging event for the cropping block starts, and the dragging event for the cropping block continues, the adjusting a size of an image in a cropping area of a cropping block includes: increasing the size of the image in the cropping area of the cropping block; and in a case that the border of the cropping block reaches the set minimum size and the dragging event for the cropping block continues, the adjusting a size of an image in a cropping area of a cropping block includes: increasing the size of the image in the cropping area of the cropping block.

On the basis of any of the above device embodiments, in a case that the border of the cropping block reaches the first target position of the image display area and the dragging event for the cropping block continues, on the one hand, the image adjusting module may continuously adjust a display size of the image in the cropping area of the cropping block, correspondingly, the current size ratio of the image in the cropping area of the cropping block is determined based on a current display size, in this case, in an image cropping process, the effect of image cropping can be previewed in real time, which helps to improve the efficiency of image cropping. On the other hand, the image adjusting module may adjust a size parameter of the image in the cropping area of the cropping block, correspondingly, the current size ratio of the image in the cropping area of the cropping block is determined based on the size parameter when the dragging event for the cropping block ends. In this case, although the effect of image cropping cannot be previewed in real time during the image cropping process, since the size parameter of the image is recorded, a result of image cropping may be displayed accurately after the dragging event ends.

On the basis of any of the above device embodiments, an image size adjustment speed may be determined based on a parameter of the dragging event for the cropping block, and the size of the image in the cropping area of the cropping block may be adjusted based on the image size adjustment speed.

During the process of implementing the present disclosure, the inventor finds, by analyzing the user's usage habits, that some dragging habits of the user when dragging the cropping block reflect the user's expectation on the image size adjustment speed. These dragging habits may be reflected in the parameter of the dragging event. Therefore, the image size adjustment speed is determined based on the parameter of the dragging event, and a dragging operation may be controlled to conform to or be close to the user's expectation on the image size adjustment speed.

The parameter of the dragging event for the cropping block may include a dragging distance, where a greater dragging distance indicates a greater image size adjustment speed.

During the process of implementing the present disclosure, the inventor finds, by analyzing the user's usage habits, that when the user drags the cropping block, a greater dragging range, i.e., a greater dragging distance of the dragging event indicates a greater image size adjustment speed expected by the user. Therefore, determining the image size adjustment speed based on the dragging distance is in line with the user's expectation.

On the basis of any of the above device embodiments, the image adjusting module is further configured to: adjust, when the dragging event for the cropping block continues, a display position of a target image to make a center of the target image always coincide with a center of the cropping area of the cropping block or make the center of the target image approach the center of the cropping area of the cropping block based on a specified path.

If a screen that the user expects to preserve is close to or located in a center region of the target image, during the image cropping process, if the display position of the target image remains unchanged, the border of the cropping block needs to be adjusted multiple times in multiple directions. If the display position of the target image is adjusted in the above manner, it is possible to avoid missing the screen that the user expects to preserve during the image cropping process, and the expected effect can be achieved by a few adjustments in a few number of directions, and the cropping efficiency can be improved.

In a third aspect, a mobile terminal is provided according to an embodiment of the disclosure. The mobile terminal includes: a memory configured to store a program for executing the method according to the method embodiments in the first aspect; and a processor configured to execute the program stored in the memory.

In the mobile terminal provided according to the embodiment of the present disclosure, when the border of the cropping block reaches the first target position of the image display area, for example, reaches a boundary of the image display area, if the cropping block is not released, that is, the dragging event for the cropping block still continues, the image cropping process may still continue, that is, in this case, a size of the image in the cropping area of the cropping block may be adjusted. Therefore, with the mobile terminal provided by the embodiment of the present disclosure, when the user drags the cropping block to the boundary of the image display area, as long as the cropping block is not released, an application for implementing the processor of the terminal provided by the embodiment of the present disclosure may continue to adjust the size of the image to achieve continuing cropping, which can avoid a case that the user frequently drags the cropping block in the same way to achieve an expected effect. Therefore, a difficulty of an image cropping operation is reduced and an efficiency of image cropping is improved.

In a fourth aspect, a computer-readable storage medium is provided according to an embodiment of the disclosure. The medium stores a program for executing the method according to the embodiments in the first aspect.

According to the program stored in the computer-readable storage medium according to the embodiment of the disclosure, when the border of the cropping block reaches the first target position of the image display area, for example, reaches a boundary of the image display area, if the cropping block is not released, that is, the dragging event for the cropping block still continues, the image cropping process may still continue, that is, in this case, a size of the image in the cropping area of the cropping block may be adjusted. Therefore, with the program stored in the computer-readable storage medium according to the embodiment of the disclosure, when the user drags the cropping block to the boundary of the image display area, as long as the cropping block is not released, the program may continue to adjust the size of the image to achieve continuing cropping, which can avoid a case that the user frequently drags the cropping block in the same way to achieve an expected effect. Therefore, a difficulty of an image cropping operation is reduced and an efficiency of image cropping is improved.

An image cropping method, an image cropping device, an apparatus and storage medium are provided according to embodiments of the disclosure, so as to reduce a complexity of a cropping operation.

In a fifth aspect, an image cropping method is provided according to an embodiment of the disclosure. The method includes: adjusting, when a dragging event for a cropping block is detected and the dragging event for the cropping block continues, a display position of a target image to make a center of the target image always coincide with a center of a cropping area of the cropping block or make the center of the target image approach the center of the cropping area of the cropping block based on a specified path; and displaying, on a target position of an image display area, an image in a current cropping area of the cropping block based on a current size ratio of an image in the cropping area of the cropping block when the dragging event for the cropping block ends.

If a screen that the user expects to preserve is close to or located in a center region of the target image, during the image cropping process, if the display position of the target image remains unchanged, the border of the cropping block needs to be adjusted multiple times in multiple directions. If the display position of the target image is adjusted according to the method provided in the fifth aspect of the embodiments of the disclosure, it is possible to avoid missing the screen that the user expects to preserve during the image cropping process, and the expected effect can be achieved by a few adjustments in a few number of directions, and the cropping efficiency can be improved, and a complexity of the cropping operation can be reduced.

In a sixth aspect, an image cropping device is provided according to an embodiment of the disclosure. The device includes: an image adjusting module configured to adjust, when a dragging event for a cropping block is detected and the dragging event for the cropping block continues, a display position of a target image to make a center of the target image always coincide with a center of a cropping area of the cropping block or make the center of the target image approach the center of the cropping area of the cropping block based on a specified path; and an image displaying module configured to display, on a target position of an image display area, an image in a current cropping area of the cropping block based on a current size ratio of an image in the cropping area of the cropping block when the dragging event for the cropping block ends.

If a screen that the user expects to preserve is close to or located in a center region of the target image, during the image cropping process, if the display position of the target image remains unchanged, the border of the cropping block needs to be adjusted multiple times in multiple directions. If the display position of the target image is adjusted according to the device provided in the sixth aspect of the embodiments of the disclosure, it is possible to avoid missing the screen that the user expects to preserve during the image cropping process, and the expected effect can be achieved by a few adjustments in a few number of directions, and the cropping efficiency can be improved, and a complexity of the cropping operation can be reduced.

In a seventh aspect, a mobile terminal is provided according to an embodiment of the disclosure. The mobile terminal includes: a memory configured to store a program for executing the method according to the method embodiments in the fifth aspect; and a processor configured to execute the program stored in the memory.

If a screen that the user expects to preserve is close to or located in a center region of the target image, during the image cropping process, if the display position of the target image remains unchanged, the border of the cropping block needs to be adjusted multiple times in multiple directions. If the display position of the target image is adjusted according to the mobile terminal provided in the seventh aspect of the embodiments of the disclosure, it is possible to avoid missing the screen that the user expects to preserve during the image cropping process, and the expected effect can be achieved by a few adjustments in a few number of directions, and the cropping efficiency can be improved, and a complexity of the cropping operation can be reduced.

In an eighth aspect, a computer-readable storage medium is provided according to an embodiment of the disclosure. The medium stores a program for executing the method according to the embodiments in the fifth aspect.

If a screen that the user expects to preserve is close to or located in a center region of the target image, during the image cropping process, if the display position of the target image remains unchanged, the border of the cropping block needs to be adjusted multiple times in multiple directions. If the display position of the target image is adjusted according to the program stored in the computer-readable storage medium provided in the eighth aspect of the embodiments of the disclosure, it is possible to avoid missing the screen that the user expects to preserve during the image cropping process, and the expected effect can be achieved by a few adjustments in a few number of directions, and the cropping efficiency can be improved, and a complexity of the cropping operation can be reduced.

BRIEF DESCRIPTION OF THE DRAWINGS

FIG. 1F is a schematic diagram of dragging directions of inward dragging according to an embodiment of the present disclosure.

FIG. 1G is a schematic diagram of dragging directions of outward dragging according to an embodiment of the present disclosure.

FIG. 2 is a flowchart of an image cropping method according to an embodiment of the present disclosure.

DETAILED DESCRIPTION OF THE EMBODIMENTS

Figure 1A:
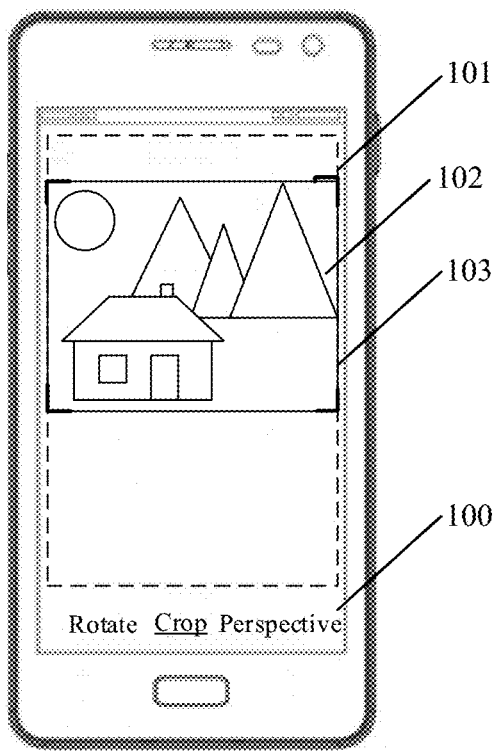
FIG. 1A is an interface display diagram of an image cropping function of an image retouching software of a mobile terminal.
Figure 1B:
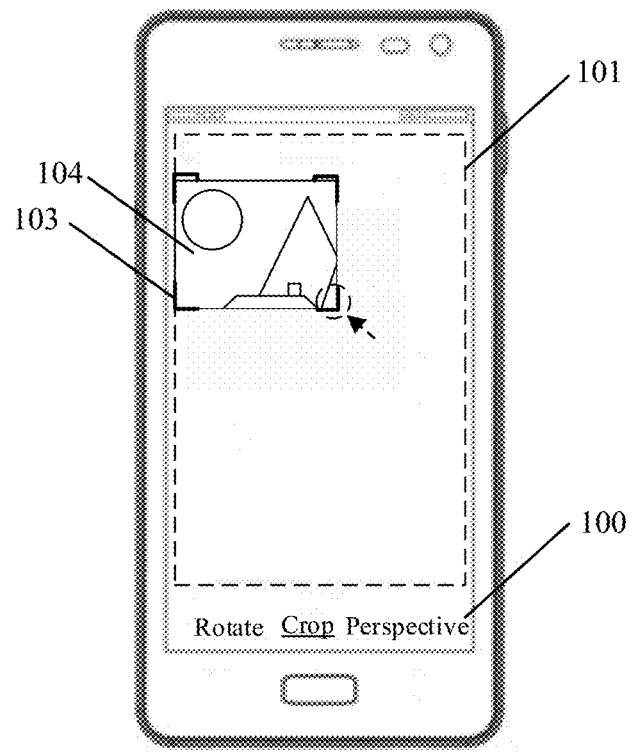
FIG. 1B is another interface display diagram of an image cropping function of an image retouching software of a mobile terminal.

In order to better understand the above technical solutions, the technical solutions of the embodiments of the present disclosure will be described in detail below with reference to the accompanying drawings and specific embodiments. It should be understood that the embodiments of the present disclosure and the specific features in the embodiments are detailed descriptions of the technical solutions of the embodiments of the present disclosure, rather than limitations of the technical solutions of the present disclosure. Embodiments and technical features in the embodiments of the present disclosure may be combined with each other without conflict.

Before describing the embodiments of the present disclosure in detail, the concepts involved therein are first described.

An image display area, also known as an operable area, is a maximum cropping area of a cropping block and a maximum display area of the target image. For example, if a size of the image display area is N×M, then the maximum size of the cropping block is N×M. If a size of the target image is N×M', and M' is greater than M, then when the target image is displayed in the image display area, the size of the target image will be compressed to N'×M, and N' is smaller than N. Here, N, M, N', and M' are positive integers and represent the number of pixels.

The cropping block is a drag control displayed in the image display area and superimposed with the target image to be cropped. The area enclosed by the border of the cropping box is called the cropping area. When the cursor or the user's finger presses the border of the cropping box and drags it, the border of the cropping box will be deformed accordingly in response to the dragging event. A shape of the border of the cropping block is not limited in the embodiments of the present disclosure. In the following embodiments, a rectangular cropping block is used as an example to describe the embodiments of the present disclosure. However, in practice, cropping blocks of other shapes may also be used, such as circular cropping block, cropping blocks with a shape of ellipses, triangles, polygons, irregular shapes and so on. Taking the rectangular cropping block as an example, the border may include four side areas and four corner areas. If one of the side areas is dragged, based on the current specific scene, following responses may be generated: a side area opposite to the dragged side area is fixed, the dragged side area is translated along a dragging direction, two side regions adjacent to the dragged side region extend/shrink along the dragging direction (depending on the scene and design, the two side regions may also be translated toward each other or away from each other while extending/shrinking, or one of the two side regions is also translated in the direction of approaching or away from the other of the two side regions while extending/contracting); a side area opposite to the dragged side area is translated in the opposite direction of the dragging direction, the dragged side area is translated along the dragging direction, two side regions adjacent to the dragged side region extend/shrink along the dragging direction (depending on the scene and design, the two side regions may also be translated toward each other or away from each other while extending/shrinking, or one of the two side regions is also translated in the direction of approaching or away from the other of the two side regions while extending/contracting); and the entire cropping block is translated along the dragging direction, the size of the cropping block remains unchanged. If one of the corner areas is dragged, based on the current specific scene, following responses may be generated: a corner area opposite to the dragged corner area is fixed, the dragged corner area is translated along a dragging direction, which causes side regions adjacent to the dragged corner region to be translated and to extend/shrink, the translation of the side region cause adjacent side regions to extend/shrink; a corner area opposite to the dragged corner area is translated in the opposite direction of the dragging direction, which causes side regions adjacent to the dragged corner region to be translated and to extend/shrink, the dragged corner area is translated along the dragging direction, which cause side regions adjacent to the dragged corner region to be translated and to extend/shrink; and the entire cropping block is translated along the dragging direction, the size of the cropping block remains unchanged. It should be pointed out that the above only illustrates the response of the cropping block to the dragging event in the form of an example, and does not limit the response of the cropping block to the dragging event. In practice, the response mode may be defined according to different scenarios.

Figure 1C:
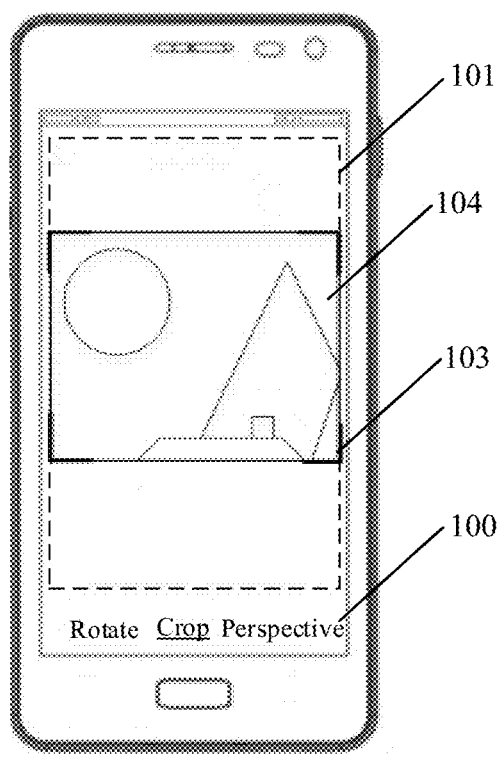
FIG. 1C is another interface display diagram of an image cropping function of an image retouching software of a mobile terminal.
Figure 1D:
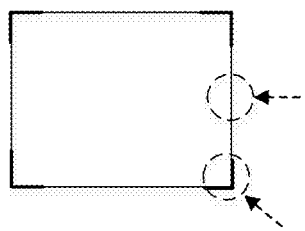
FIG. 1D is a schematic diagram of dragging directions of inward dragging according to an embodiment of the present disclosure.
Figure 1E:
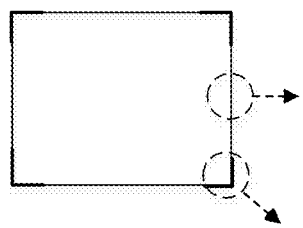
FIG. 1E is a schematic diagram of dragging directions of outward dragging according to an embodiment of the present disclosure.

In a rough division method, the dragging direction may be divided into inward dragging and outward dragging, the arrow direction shown in FIG. 1D is the inward dragging, the arrow direction shown in FIG. 1E is the outward dragging. Further, the inward dragging may be abstracted into eight dragging directions shown in FIG. IF, and the outward dragging may be abstracted into eight dragging directions shown in FIG. 1G. In practice, if the dragging path of the dragging event is detected to extend away from the clipping area, the dragging direction is outward dragging, otherwise, the dragging direction is inward dragging. Furthermore, it is determined an angle between which of the eight directions and a reference line is the closest to an angle between the connecting line of the two sampling points on the dragging path and the reference line, the determined direction is taken as the dragging direction of the dragging event. It should be noted that, in practice, the dragging direction may also be defined as required, and other methods may also be used to determine the dragging direction, which is not limited in this embodiment of the present disclosure.

As shown in FIG. 2, an image cropping method is provided according to an embodiment of the present disclosure. The method includes steps 110 to 120.

In step 110, a size of an image in a cropping area of a cropping block is adjusted in a case that a border of the cropping block reaches a first target position of an image display area and a dragging event for the cropping block continues.

The dragging event for the cropping block refers to a dragging event acting on the border of the cropping block.

The cropping block and the target image to be cropped are superimposed and displayed in the image display area, and the image in the cropping area of the cropping block is the part of the target image in the cropping area.

A judgment condition of "the dragging event for the cropping block continues" is not limited in the embodiment of the present disclosure. In practice, the judgment condition may be determined according to the usage scenario and product design requirements. Taking a mobile terminal as an example, after the user drags the cropping block, as long as the cropping block is not released and the user's finger is always within a touch area of the mobile terminal, it is determined that "the dragging event for the cropping block continues". Alternatively, after the user drags the cropping block, as long as the cropping block is not released and the user's finger is always in the image display area, it is determined that "the dragging event for the cropping block continues". Once the user's finger leaves the image display area, it is determined that "the dragging event for the cropping block ends".

The implementation manner of determining the above-mentioned situation is not limited in this embodiment of the present disclosure. In practice, existing implementation manners may be used to determine the above-mentioned situation. For example, a coordinate of the first target position is stored or a rule for the first target position is determined in advance, the position coordinate of the border of the cropping block is determined in real time, and the position coordinate of the border and the coordinate of the first target position are compared in real time, or it is determined whether the position coordinate of the border conforms to the description of the rule for the first target position in real time, so as to determine whether the border of the cropping block reaches the first target position of the image display area.

In step 120, an image in a current cropping area of the cropping block is displayed on a second target position of the image display area based on a current size ratio of the image in the cropping area of the cropping block when the dragging event for the cropping block ends.

The dragging event for the cropping block ending means that the cropping block is released.

The second target position may be a predetermined fixed position, or may be a position determined based on a predetermined rule. The specific implementation for the predetermined fixed position and the predetermined rule is not limited in the embodiments of the present disclosure. In practice, they are set as required.

The current size ratio of the image in the cropping area of the cropping block refers to the adjusted size ratio of the image when the dragging event ends.

Displaying the image based on the current size ratio of the image in the cropping area of the cropping block refers to displaying the image based on the current size ratio in a manner of proportionally enlarging, proportionally narrowing, or invariant proportion.

The current cropping area of the cropping block refers to the cropping area of the cropping block when the dragging event the ends.

In the image cropping method provided according to the embodiment of the present disclosure, when the border of the cropping block reaches the first target position of the image display area, for example, reaches a boundary of the image display area, if the cropping block is not released, that is, the dragging event for the cropping block still continues, the image cropping process may still continue, that is, in this case, a size of the image in the cropping area of the cropping block may be adjusted. Therefore, with the method provided by the embodiment of the present disclosure, when the user drags the cropping block to the boundary of the image display area, as long as the cropping block is not released, an application for implementing the method provided by the embodiment of the present disclosure may continue to adjust the size of the image to achieve continuing cropping, which can avoid a case that the user frequently drags the cropping block in the same way to achieve an expected effect. Therefore, a difficulty of an image cropping operation is reduced and an efficiency of the image cropping is improved.

Optionally, the size of the image in the cropping area of the cropping block is adjusted in a case that the border of the cropping block reaches the first target position of the image display area and the dragging event for the cropping block continues, until the dragging event for the cropping block ends or the border of the cropping block reaches a boundary of a target image. The image in the cropping area of the cropping block is a part of the target image.

The border of the cropping block reaches the boundary of the target image may mean that a part of the border of the cropping block (such as a certain side area or a certain corner area) reaches a part of the boundary of the target image (such as a certain side or a certain corner on the boundary of the target image), or mean that the border of the cropping block coincides with the boundary of the target image, which is not limited in this embodiment of the present disclosure and may be defined according to requirements in practice.

The boundary of the target image may refer to the boundary of the target image under the display size (such as the above N'×M) before cropping, or it may refer to the boundary of the target image under the original size (such as the above N×M') of the target image, which is not limited in this embodiment of the present disclosure and may be defined according to requirements in practice.

The purpose of image cropping is to preserve a screen required by the user by cropping. Generally, when the border of the cropping block reaches the boundary of the target image, the screen required by the user may already appear, so there is no need to continue to adjust the size of the image. Therefore, "the border of the cropping block reaches the boundary of the target image" is preset as a stopping condition for image size adjustment. When the stopping condition is met, the image cropping is automatically stopped to improve a quality and effect of image cropping.

It should be noted that, according to different application scenarios and product design requirements, no stopping condition may be set for image size adjustment during the dragging process, and other stopping conditions may be set according to requirements, which is not limited in this embodiment of the present disclosure.

In any of the above method embodiments, the first target position of the image display area may be any of following positions: a boundary of the image display area, and a position of the border of the cropping block on the image display area when the border of the cropping block reaches a set minimum size.

The border of the cropping block reaching a set minimum size means that any part of the border reaches the minimum size, for example, a length of a certain side area reaches the minimum size for the length of the certain side area. Alternatively, the border of the cropping block reaching a set minimum size means that a cropping area surrounded by the border of the cropping block reaches the set minimum size. The specific value of the minimum size is preset.

In addition, the first target position may also be other positions, which are not limited in this embodiment of the present disclosure, and are defined according to actual scenarios and/or product design requirements in practice.

It can be seen that, in the method provided by the embodiment of the present disclosure, when the border of the cropping block reaches the boundary of the image display area, the image cropping may still be continued. In addition, when the border of the cropping block reaches the set minimum size, the image cropping may still be continued.

On this basis, for different situations, the implementation of adjusting the size of the image may be different. By way of example and not limitation, in a case that the border of the cropping block reaches the boundary of the image display area, the border of the cropping block does not coincide with the boundary of the target image when the dragging event for the cropping block starts, and the dragging event for the cropping block continues, the adjusting a size of an image in a cropping area of a cropping block includes: reducing the size of the image in the cropping area of the cropping block. In a case that the border of the cropping block reaches the boundary of the image display area, the border of the cropping block coincides with the boundary of the target image when the dragging event for the cropping block starts, and the dragging event for the cropping block continues, the adjusting a size of an image in a cropping area of a cropping block includes: increasing the size of the image in the cropping area of the cropping block. In a case that the border of the cropping block reaches the set minimum size and the dragging event for the cropping block continues, the adjusting a size of an image in a cropping area of a cropping block includes: increasing the size of the image in the cropping area of the cropping block.

It should be pointed out that since the image in the cropping area of the cropping block is a part of the target image, in the process of narrowing the image in the cropping area of the cropping block, an overall size ratio of the target image is continuously reduced. A part of the target image outside the cropping area will gradually appear inside the cropping area of the cropping block. Therefore, in an implementation manner of reducing the image size, the size of the image in the cropping area of the cropping block is reduced to make a proportion of the image displayed in the cropping area of the cropping block in the target image increase. More specifically, the display size of the image in the cropping area of the cropping block may be continuously reduced, so that the proportion of the image displayed in the cropping area of the cropping block in the target image continuously increases. In this implementation method, a cropping effect may be shown to the user during the image narrowing process, which helps to improve the efficiency of image cropping and improve user experience.

Apparently, in addition to the above method, there may also be other implementation methods for reducing the size of the image. For example, the display size of the image in the cropping area of the cropping block is continuously reduced, and content of the image remains unchanged, that is, the proportion of the image displayed in the cropping area of the cropping block in the target image remains unchanged. Alternatively, a size parameter of the image in the cropping area of the cropping block is reduced, and a display size of the image in the cropping area of the cropping block is not adjusted based on the size parameter before a preset trigger condition is met (for example, the dragging event ends). When the preset trigger condition is met, the image in the cropping area of the cropping block is narrowed based on the size parameter adjusted last time, so that the proportion of the image displayed in the cropping area of the cropping block in the target image increases.

The specific implementation logic for image size adjustment is not limited in the embodiment of the present disclosure, and may be determined according to usage scenarios and product design requirements in practice.

In the embodiment of the present disclosure, the border of the cropping block reaches the boundary of the image display area may mean that a part of the border of the cropping block (such as a certain side area or a certain corner area) reaches a part of the boundary of the image display area (such as a certain side or a certain corner on the boundary of the image display area), or mean that the border of the cropping block coincides with the boundary of the image display area, which is not limited in this embodiment of the present disclosure and may be defined according to requirements in practice.

It should be noted that, while adjusting the image size, the border size of the cropping block may also be adjusted, which is not limited in this embodiment of the present disclosure. In practice, the border size adjustment logic for the cropping block is determined according to the usage scenario and product design requirements.

On the basis of any of the above method embodiments, in a case that the border of the cropping block reaches the first target position of the image display area and the dragging event for the cropping block continues, on the one hand, a display size of the image in the cropping area of the cropping block may be continuously adjusted, correspondingly, the current size ratio of the image in the cropping area of the cropping block is determined based on a current display size, in this case, in an image cropping process, the effect of image cropping can be previewed in real time, which helps to improve the efficiency of image cropping. On the other hand, a size parameter of the image in the cropping area of the cropping block may be adjusted, correspondingly, the current size ratio of the image in the cropping area of the cropping block is determined based on the size parameter when the dragging event for the cropping block ends. In this case, although the effect of image cropping cannot be previewed in real time during the image cropping process, since the size parameter of the image is recorded, a result of image cropping may be displayed accurately after the dragging event ends.

The display size of the image refers to the size of the image displayed in the image display area, and the display size of the image is continuously adjusted, that is, the adjustment result for the image size is previewed in real time.

The size parameter of the image refers to a parameter stored in the memory, and the parameter determines the display size of the image. The size parameter of the image is adjusted, that is, there is no need to preview the image size adjustment result in real time, only the size parameter in the memory is adjusted. When the adjustment result needs to be displayed, the image is displayed based on the last adjusted size parameter.

On the basis of any of the above method embodiments, an image size adjustment speed may be determined based on a parameter of the dragging event for the cropping block, and the size of the image in the cropping area of the cropping block may be adjusted based on the image size adjustment speed.

During the process of implementing the present disclosure, the inventor finds, by analyzing the user's usage habits, that some dragging habits of the user when dragging the cropping block reflect the user's expectation on the image size adjustment speed. These dragging habits may be reflected in the parameter of the dragging event. Therefore, the image size adjustment speed is determined based on the parameter of the dragging event, and a dragging operation may be controlled to conform to or be close to the user's expectation on the image size adjustment speed.

The parameter of the dragging event for the cropping block may include a dragging distance, a greater dragging distance indicates a greater image size adjustment speed. The parameter of the dragging event for the cropping block may also include touch pressure, the number of touch points, and the like.

The specific control logic for the image size adjustment speed is not limited in the embodiment of the present disclosure, which may be determined according to the usage scenario and product design requirements in practice. Taking the dragging distance as an example, the image size adjustment speed may be determined in real time, and in each determination period, the image size adjustment speed is determined based on the straight-line distance dragged in the determination period. There is a predetermined function relationship between the dragging distance and image size adjustment speed. If the dragging distance is 0, the image dragging speed is a fixed value, and the fixed value may be a predetermined value or a value determined in real time at the last time.

During the process of implementing the present disclosure, the inventor finds, by analyzing the user's usage habits, that when the user drags the cropping block, a greater dragging range, i.e., a greater dragging distance of the dragging event indicates a greater image size adjustment speed expected by the user. Therefore, determining the image size adjustment speed based on the dragging distance is in line with the user's expectation.

On the basis of any of the above method embodiments, the method provided by the embodiment of the present disclosure may further include: adjusting, when the dragging event for the cropping block continues, a display position of a target image to make a center of the target image always coincide with a center of the cropping area of the cropping block or make the center of the target image approach the center of the cropping area of the cropping block based on a specified path.

More specifically, in a case that the dragging event continues and the border of the cropping block has not yet reached the boundary of the image display area, the display position of the image is adjusted based on the above adjustment logic. In a case that the dragging event continues and the border of the cropping block reaches the boundary of the image display area, the display position of the image is adjusted based on the other adjustment logics, or the display position of the target image is not adjusted no longer. The display position of the image may also be adjusted based on the above adjustment logic during the entire duration of the dragging event.

The specific implementation means for adjusting the display position of the target image is not limited in the embodiments of the present disclosure, which may be a conventional means. For example, in order to make the center of the target image always coincide with the center of the cropping area of the cropping block, a coordinate value of a center point of the cropping area of the cropping block may be acquired in real time, and the coordinate value may be assigned to the center point of the target image. The display position of the target image is adjusted based on the coordinate value of the center point of the target image after the value assignment.

The specified path may be predetermined or calculated based on a predetermined rule.

If the center of the target image approaches the center of the cropping area of the cropping block based on the specified path, the target image may also be moved based on the image size adjustment speed determined above.

If a screen that the user expects to preserve is close to or located in a center region of the target image, during the image cropping process, if the display position of the target image remains unchanged, the border of the cropping block needs to be adjusted multiple times in multiple directions. If the display position of the target image is adjusted in the above manner, it is possible to avoid missing the screen that the user expects to preserve during the image cropping process, and the expected effect can be achieved by a few adjustments in a few number of directions, and the cropping efficiency can be improved.

The image cropping method provided by the embodiment of the present disclosure will be described below with respect to different image cropping modes and cropping block dragging manners in combination with specific application scenarios.

In this specific scenario, after the user selects the target image and triggers the cropping function, as shown in FIG. 1A, a target image 102 and a cropping block 103 are superimposed and displayed on an image display area 101 of a display screen 100 of a mobile terminal. A border of the cropping block 103 coincides with a boundary of the target image 102.

In a first image cropping mode, an image cropping ratio is not limited, which means that a border ratio of the cropping block may be arbitrarily changed within the image display area.

In a first cropping block dragging manner based on the first image cropping mode, the cropping block is dragged inward. In this embodiment, if a dragged border area is a length-side area, then a width of the cropping block is adjusted based on a dragging distance. If the dragged border area is a width-side area, then a length of the cropping block is adjusted based on the dragging distance. If the dragged border area is a corner area, then the length and width of the cropping block are proportionally adjusted based on the dragging distance.

No matter which border area of the cropping block is dragged, the size of the cropping block will be changed. During the dragging event, both the display size and the display position of the target image are not adjusted, or the display size of the target image is not adjusted and the display position of the target image is adjusted. For the adjustment manner, the description of the above-mentioned embodiment may be referred.

If the length-side area and/or width-side area of the cropping block is dragged to a preset minimum size, the size of the cropping block will not change. At this time, if the dragging event still continues, the size of the image in the cropping block is increased to continue the image cropping. In this embodiment, since the part of the target image outside the cropping block is not displayed, only the size of the image in the cropping block is increased; or the size of the whole target image is increased, so as to increase the size of the image in the cropping block.

Figure 3A:
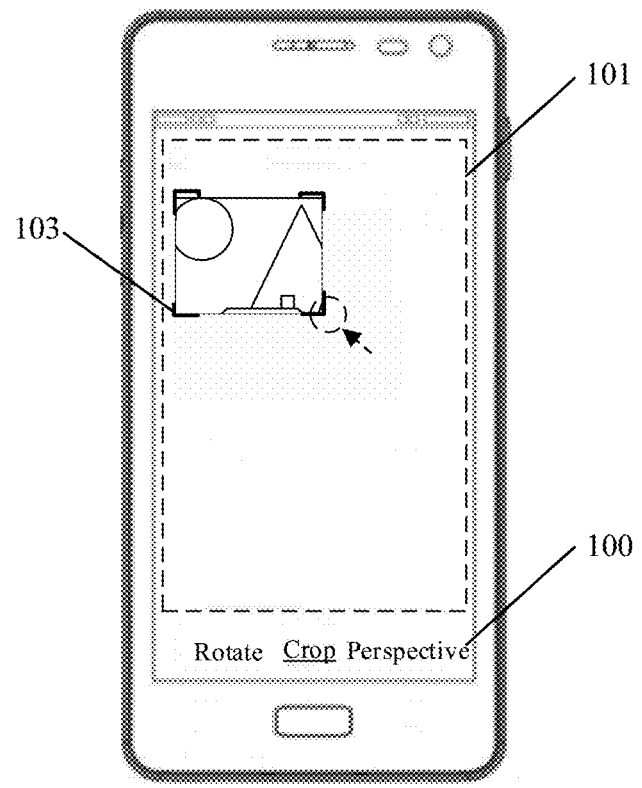
FIG. 3A is a schematic diagram of a cropping state according to an embodiment of the present disclosure.
Figure 3B:
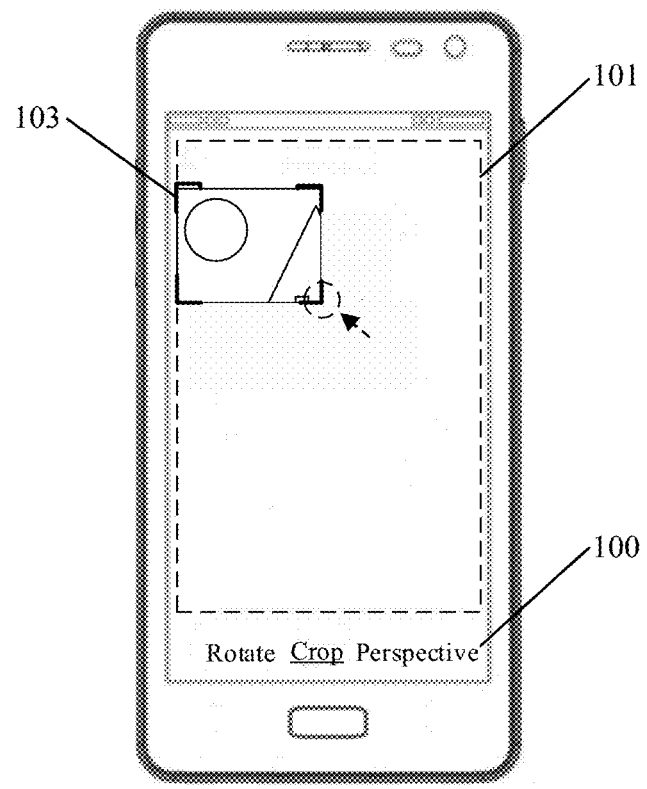
FIG. 3B is a schematic diagram of another cropping state according to an embodiment of the present disclosure.

In this embodiment, during the image enlargement process, as shown in FIG. 3A, the center of the image in the cropping block is always kept at the center of the cropping block. In practice, there may also be other implementation logics. For example, as shown in FIG. 3B, the image boundary corresponding to the dragging event is fixed and the image is enlarged.

In this embodiment, after the border of the cropping block reaches the minimum size, the basis for performing the operation of enlarging the image is that the dragging event continues all the time, and the dragging direction is inward dragging.

In this embodiment, after the border of the cropping block reaches the minimum size, if the user's finger continues to drag the cropping block, and the dragging position does not change, then the image is enlarged at a constant speed. If the user's finger continues to drag the cropping block and the dragging position changes, a real-time image size adjustment speed is calculated based on the real-time dragging distance, and the image is enlarged in real time based on the image size adjustment speed determined in real time.

In a second cropping block dragging manner based on the first image cropping mode, on the basis of the aforementioned operation of dragging the cropping block inward, the cropping block is dragged outward. The initial state is shown in FIG. 1C. In this embodiment, if a dragged border area is a length-side area, then a width of the cropping block is adjusted based on a dragging distance. If the dragged border area is a width-side area, then a length of the cropping block is adjusted based on the dragging distance. If the dragged border area is a corner area, then the length and width of the cropping block are proportionally adjusted based on the dragging distance.

No matter which border area of the cropping block is dragged, the size of the cropping block will be changed. During the dragging event, both the display size and the display position of the target image are not adjusted, or the display size of the target image is not adjusted and the display position of the target image is adjusted. For the adjustment manner, the description of the above-mentioned embodiment may be referred.

If the length-side area and/or width-side area of the cropping block is dragged to the boundary of the image display area, the size of the cropping block will not change. At this time, if the dragging event still continues, the size of the image in the cropping block is induced to continue the image cropping. In this embodiment, the size of the whole target image may be reduced, so as to reduce the size of the image in the cropping block, until the border of the cropping block coincides with the boundary of the target image.

Figure 4A:
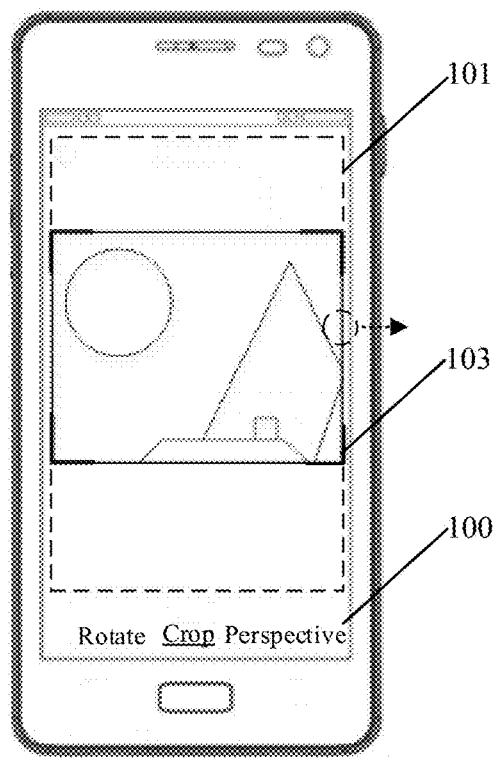
FIG. 4A is a schematic diagram of a first cropping state according to another embodiment of the present disclosure.
Figure 4B:
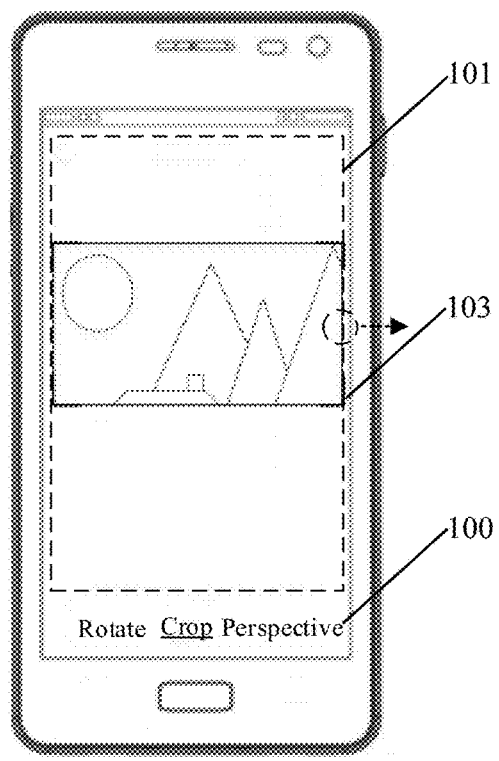
FIG. 4B is a schematic diagram of a second cropping state according to another embodiment of the present disclosure.

As shown in FIG. 4A, the right border of the cropping block 103 is dragged outward until the right boundary of the image display area 101 is reached. If the dragging event continues, then the size of the image is reduced as shown in FIG. 4B. When the right border of the cropping block 103 coincides with the right boundary of the target image, if the dragging event continues, the width of the cropping block is adjusted until the upper and lower borders of the cropping block coincide with the upper and lower boundaries of the target image. It should be pointed out that the image narrowing logic shown in FIG. 4B is that the left boundary of the image is fixed. If other implementation logic is adopted, a following case may occur, the right border of the cropping block 103 overlaps with the right boundary of the target image, but the left border of the cropping block 103 does not overlap with the left boundary of the target image, if the dragging event continues, the target image will continue to be narrowed until the left border of the cropping block 103 overlaps with the left boundary of the target image.

By comparing FIGS. 4A and 4B, it can be seen that in the process of narrowing the image in the cropping area of the cropping block, the part of the target image that was originally located outside the cropping area will be gradually displayed in the cropping area of the cropping block, the proportion of the image displayed in the cropping area of the cropping block in the target image gradually increases.

In this embodiment, during the image narrowing process, the border size of the cropping block may be adjusted according to a preset rule until it overlaps with the boundary of the target image. The preset rule is not limited in this disclosure, which may be determined according to usage scenarios and product design requirements.

In this embodiment, during the image narrowing process, the left boundary of the image in the cropping block is always coincides with the left border of the cropping block. In practice, there may be other implementation logics. For example, the boundary of the image corresponding to the dragging event is fixed, and the image is narrowed. For another example, the center of the target image is always kept at the center of the cropping block. For another example, the center of the target image continuously approaches the center of the cropping box. For another example, the center of the image in the cropping box is always kept at the center of the cropping box.

In this embodiment, after the border of the cropping block reaches the boundary of the image display area, the basis for performing the operation of narrowing the image is that the dragging event continues all the time, and the dragging direction is outward dragging.

In this embodiment, after the border of the cropping block reaches the boundary of the image display area, if the user's finger continues to drag the cropping block, and the dragging position does not change, then the image is narrowed at a constant speed. If the user's finger continues to drag the cropping block and the dragging position changes, a real-time image size adjustment speed is calculated based on the real-time dragging distance, and the image is narrowed in real time based on the image size adjustment speed determined in real time.

In a third cropping block dragging manner based on the first image cropping mode, after the user selects the target image and triggers the cropping function, the user drags the cropping block outward, and the initial state is shown in FIG. 1A. At this point, the left and right borders of the cropping block have reached the left and right boundaries of the image display interface.

If the opposite corner areas or the left and right side areas of the cropping block are dragged outward, in this embodiment, the size of the cropping block will not change, but the image will be enlarged according to the dragging direction. For the specific enlargement manner and enlargement logic, reference may be made to the descriptions of the foregoing embodiments, which will not be repeated here.

In a second image cropping mode, the image cropping ratio is specified, which means that a border ratio of the cropping block remains unchanged in the image display area, and the image is scaled according to the specified ratio. The cropping implementation process corresponding to each cropping block dragging manner based on the second image cropping mode may refer to the corresponding process in the first image cropping mode, which will not be repeated here. The only difference is that in the process of scaling the image in the second image cropping mode, the specified ratio is always unchanged.

Figure 5:
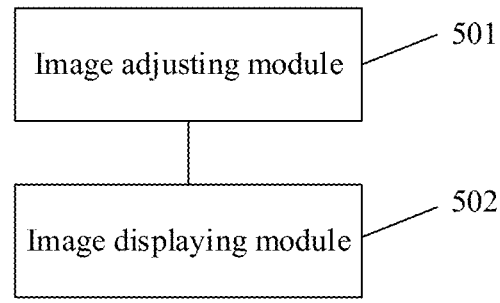
FIG. 5 is a block diagram of an image cropping device according to an embodiment of the present disclosure.

Based on the same inventive concept as the method shown in FIG. 2, an image cropping device is provided according to an embodiment of the disclosure. As shown in FIG. 5, the device includes: an image adjusting module 501, configured to adjust a size of an image in a cropping area of a cropping block in a case that a border of the cropping block reaches a first target position of an image display area and a dragging event for the cropping block continues; and an image displaying module 502, configured to display, on a second target position of the image display area, an image in a current cropping area of the cropping block based on a current size ratio of the image in the cropping area of the cropping block when the dragging event for the cropping block ends.

In the image cropping device provided according to the embodiment of the present disclosure, when the border of the cropping block reaches the first target position of the image display area, for example, reaches a boundary of the image display area, if the cropping block is not released, that is, the dragging event for the cropping block still continues, the image cropping process may still continue, that is, in this case, a size of the image in the cropping area of the cropping block may be adjusted. Therefore, with the device provided by the embodiment of the present disclosure, when the user drags the cropping block to the boundary of the image display area, as long as the cropping block is not released, an application for implementing the device provided by the embodiment of the present disclosure may continue to adjust the size of the image to achieve continuing cropping, which can avoid a case that the user frequently drags the cropping block in the same way to achieve an expected effect. Therefore, a difficulty of an image cropping operation is reduced and an efficiency of the image cropping is improved.

Optionally, the image adjusting module is configured to adjust the size of the image in the cropping area of the cropping block in a case that the border of the cropping block reaches the first target position of the image display area and the dragging event for the cropping block continues, until the dragging event for the cropping block ends or the border of the cropping block reaches a boundary of a target image. The image in the cropping area of the cropping block is a part of the target image.

It should be pointed out that the purpose of image cropping is to preserve a screen required by the user by cropping. Generally, when the border of the cropping block reaches the boundary of the target image, the screen required by the user may already appear, so there is no need to continue to adjust the size of the image. Therefore, "the border of the cropping block reaches the boundary of the target image" is preset as a stopping condition for image size adjustment. When the stopping condition is met, the image cropping is automatically stopped to improve a quality and effect of image cropping.

In any of the above device embodiments, the first target position of the image display area may be any of following positions: a boundary of the image display area, and a position of the border of the cropping block on the image display area when the border of the cropping block reaches a set minimum size.

It can be seen that, in the device provided by the embodiment of the present disclosure, when the border of the cropping block reaches the boundary of the image display area, the image cropping may still be continued. In addition, when the border of the cropping block reaches the set minimum size, the image cropping may still be continued.

On this basis, in a case that the border of the cropping block reaches the boundary of the image display area, the border of the cropping block does not coincide with the boundary of the target image when the dragging event for the cropping block starts, and the dragging event for the cropping block continues, the adjusting a size of an image in a cropping area of a cropping block includes: reducing the size of the image in the cropping area of the cropping block; in a case that the border of the cropping block reaches the boundary of the image display area, the border of the cropping block coincides with the boundary of the target image when the dragging event for the cropping block starts, and the dragging event for the cropping block continues, the adjusting a size of an image in a cropping area of a cropping block includes: increasing the size of the image in the cropping area of the cropping block; and in a case that the border of the cropping block reaches the set minimum size and the dragging event for the cropping block continues, the adjusting a size of an image in a cropping area of a cropping block includes: increasing the size of the image in the cropping area of the cropping block.

On the basis of any of the above device embodiments, in a case that the border of the cropping block reaches the first target position of the image display area and the dragging event for the cropping block continues, on the one hand, the image adjusting module may continuously adjust a display size of the image in the cropping area of the cropping block, correspondingly, the current size ratio of the image in the cropping area of the cropping block is determined based on a current display size, in this case, in an image cropping process, the effect of image cropping can be previewed in real time, which helps to improve the efficiency of image cropping. On the other hand, the image adjusting module may adjust a size parameter of the image in the cropping area of the cropping block, correspondingly, the current size ratio of the image in the cropping area of the cropping block is determined based on the size parameter when the dragging event for the cropping block ends. In this case, although the effect of image cropping cannot be previewed in real time during the image cropping process, since the size parameter of the image is recorded, a result of image cropping may be displayed accurately after the dragging event ends.

On the basis of any of the above device embodiments, an image size adjustment speed may be determined based on a parameter of the dragging event for the cropping block, and the size of the image in the cropping area of the cropping block may be adjusted based on the image size adjustment speed.

During the process of implementing the present disclosure, the inventor finds, by analyzing the user's usage habits, that some dragging habits of the user when dragging the cropping block reflect the user's expectation on the image size adjustment speed. These dragging habits may be reflected in the parameter of the dragging event. Therefore, the image size adjustment speed is determined based on the parameter of the dragging event, and a dragging operation may be controlled to conform to or be close to the user's expectation on the image size adjustment speed.

The parameter of the dragging event for the cropping block may include a dragging distance, where a greater dragging distance indicates a greater image size adjustment speed.

During the process of implementing the present disclosure, the inventor finds, by analyzing the user's usage habits, that when the user drags the cropping block, a greater dragging range, i.e., a greater dragging distance of the dragging event indicates a greater image size adjustment speed expected by the user. Therefore, determining the image size adjustment speed based on the dragging distance is in line with the user's expectation.

On the basis of any of the above device embodiments, the image adjusting module is further configured to: adjust, when the dragging event for the cropping block continues, a display position of the image in the cropping area of the cropping block to make a center of the target image always coincide with a center of the cropping area of the cropping block or make the center of the target image approach the center of the cropping area of the cropping block based on a specified path.

If a screen that the user expects to preserve is close to or located in a center region of the target image, during the image cropping process, if the display position of the target image remains unchanged, the border of the cropping block needs to be adjusted multiple times in multiple directions. If the display position of the target image is adjusted in the above manner, it is possible to avoid missing the screen that the user expects to preserve during the image cropping process, and the expected effect can be achieved by a few adjustments in a few number of directions, and the cropping efficiency can be improved.

Figure 6:
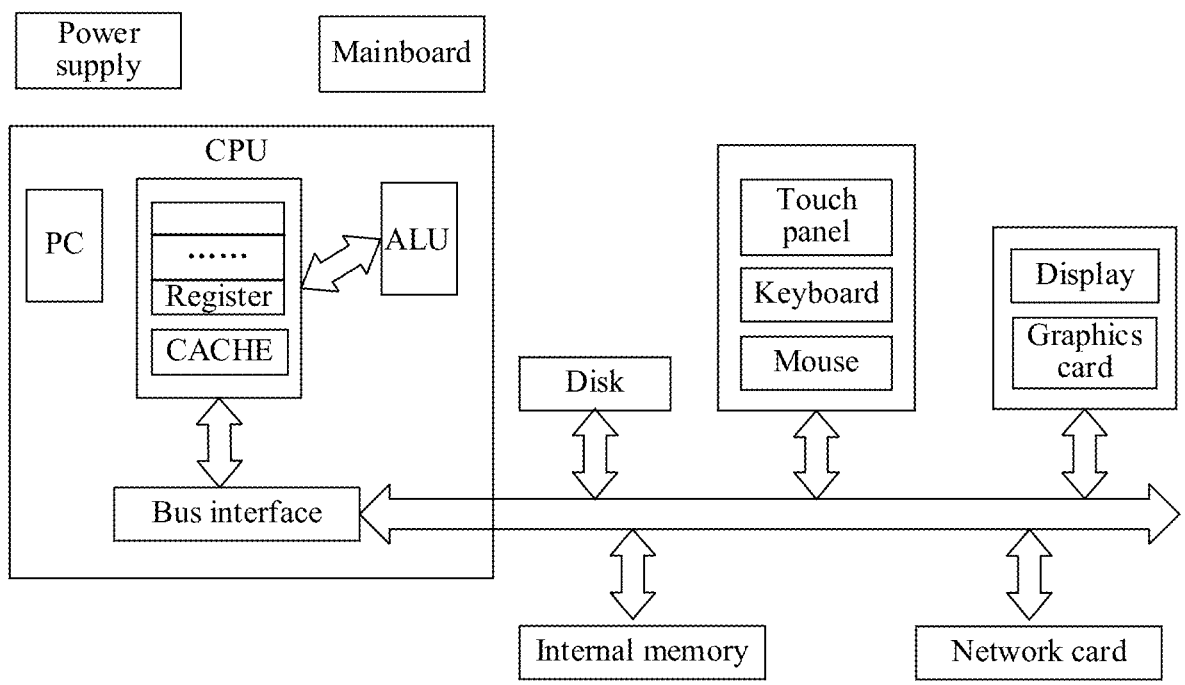
FIG. 6 is a schematic structural diagram of a mobile terminal according to an embodiment of the present disclosure.

Based on the same inventive concept as the method shown in FIG. 2, a mobile terminal is provided according to an embodiment of the disclosure. As shown in FIG. 6, the mobile terminal includes: a memory configured to store a program for executing the method according to the method embodiments; and a processor configured to execute the program stored in the memory.

In the mobile terminal provided according to the embodiment of the present disclosure, when the border of the cropping block reaches the first target position of the image display area, for example, reaches a boundary of the image display area, if the cropping block is not released, that is, the dragging event for the cropping block still continues, the image cropping process may still continue, that is, in this case, a size of the image in the cropping area of the cropping block may be adjusted. Therefore, with the mobile terminal provided by the embodiment of the present disclosure, when the user drags the cropping block to the boundary of the image display area, as long as the cropping block is not released, an application for implementing the processor of the terminal provided by the embodiment of the present disclosure may continue to adjust the size of the image to achieve continuing cropping, which can avoid a case that the user frequently drags the cropping block in the same way to achieve an expected effect. Therefore, a difficulty of an image cropping operation is reduced and an efficiency of image cropping is improved.

As shown in FIG. 6, the mobile terminal provided in this embodiment of the present disclosure further includes an input device (such as a touch screen, a camera, a microphone), an output device (such as a display screen, a speaker), a communication module, and a power supply module.

The memory, the input device, the output device, the communication module, and the power module are connected to the processor through a serial port, a bus or a USB interface.

For a mobile terminal with a single processor, the processor is a CPU (central processing unit). For a mobile terminal with two processors, the processors include a main processor and a slave processor, and the main processor executes an application program to implement the method provided by the embodiments of the present disclosure. If it is necessary to communicate with the outside world, the communication is implemented by the communication module controlled by the processor. For a mobile terminal including a GPU (graphics processing unit) and a CPU, the processor refers to the GPU and the CPU, and the GPU and the CPU cooperate with to each other to implement the method provided by the embodiments of the present disclosure or CPU alone implements the method provided by the embodiments of the present disclosure.

It should be noted that different mobile terminals (single-processor smartphones, dual-processor smartphones, smart wearable devices, tablet computers, etc.) may include more or less hardware structures than those of the mobile terminal shown in FIG. 6. All the mobile terminals which include a memory and a processor and can implement the functions of the above method embodiments fall within the protection scope of the present disclosure.

Those skilled in the art may clearly understand that, for the convenience and conciseness of description, the specific working processes of the above-described devices and units may refer to the corresponding processes in the above-mentioned method embodiments, and is not described in detail here.

Based on the same inventive concept as the method shown in FIG. 2, a computer-readable storage medium is provided according to an embodiment of the disclosure. The medium stores a program for executing the method according to the above embodiments.

According to the program stored in the computer-readable storage medium according to the embodiment of the disclosure, when the border of the cropping block reaches the first target position of the image display area, for example, reaches a boundary of the image display area, if the cropping block is not released, that is, the dragging event for the cropping block still continues, the image cropping process may still continue, that is, in this case, a size of the image in the cropping area of the cropping block may be adjusted. Therefore, with the program stored in the computer-readable storage medium according to the embodiment of the disclosure, when the user drags the cropping block to the boundary of the image display area, as long as the cropping block is not released, the program may continue to adjust the size of the image to achieve continuing cropping, which can avoid a case that the user frequently drags the cropping block in the same way to achieve an expected effect. Therefore, a difficulty of an image cropping operation is reduced and an efficiency of image cropping is improved.

Figure 7:
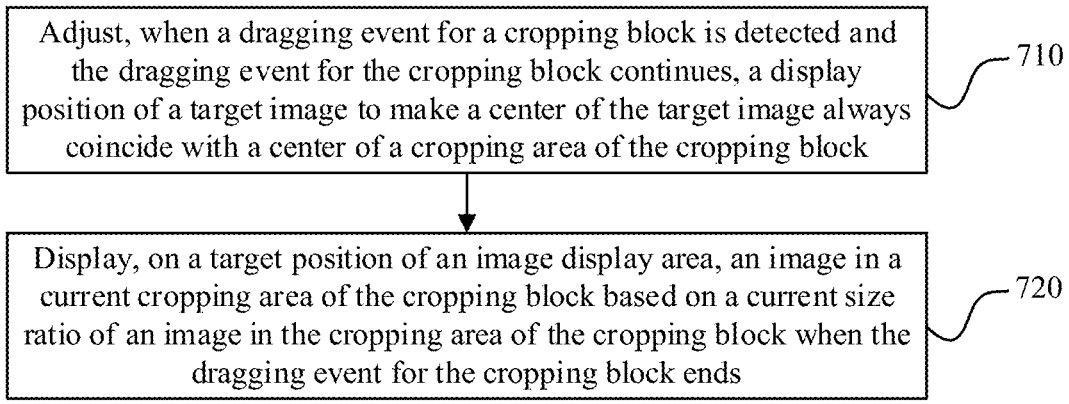
FIG. 7 is a flowchart of an image cropping method according to another embodiment of the present disclosure.

As shown in FIG. 7, an image cropping method is provided according to an embodiment of the disclosure. The method includes: step 710 of adjusting, when a dragging event for a cropping block is detected and the dragging event for the cropping block continues, a display position of a target image to make a center of the target image always coincide with a center of a cropping area of the cropping block; and step 720 of displaying, on a target position of an image display area, an image in a current cropping area of the cropping block based on a current size ratio of an image in the cropping area of the cropping block when the dragging event for the cropping block ends.

Figure 8:
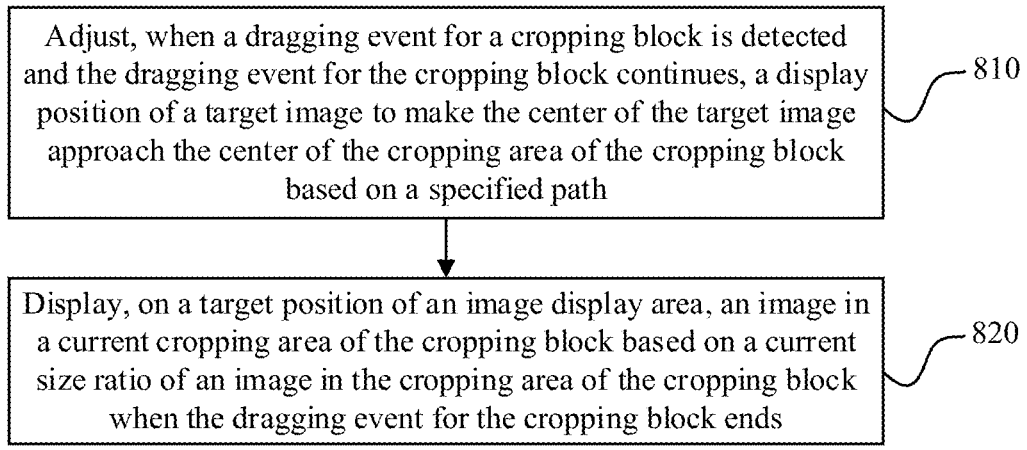
FIG. 8 is a flowchart of an image cropping method according to another embodiment of the present disclosure.

As shown in FIG. 8, an image cropping method is provided according to an embodiment of the disclosure. The method includes: step 810 of adjusting, when a dragging event for a cropping block is detected and the dragging event for the cropping block continues, a display position of a target image to make the center of the target image approach the center of the cropping area of the cropping block based on a specified path; and step 820 of displaying, on a target position of an image display area, an image in a current cropping area of the cropping block based on a current size ratio of an image in the cropping area of the cropping block when the dragging event for the cropping block ends.

If a screen that the user expects to preserve is close to or located in a center region of the target image, during the image cropping process, if the display position of the target image remains unchanged, the border of the cropping block needs to be adjusted multiple times in multiple directions. If the display position of the target image is adjusted according to the method provided in the fifth aspect of the embodiments of the disclosure, it is possible to avoid missing the screen that the user expects to preserve during the image cropping process, and the expected effect can be achieved by a few adjustments in a few number of directions, and the cropping efficiency can be improved, and a complexity of the cropping operation can be reduced.

Based on the same inventive concept as the image cropping method shown in FIG. 7, an image cropping device is provided according to an embodiment of the disclosure. The device includes: an image adjusting module configured to adjust, when a dragging event for a cropping block is detected and the dragging event for the cropping block continues, a display position of an image in the cropping area of the cropping block to make a center of the target image always coincide with a center of a cropping area of the cropping block; and an image displaying module configured to display, on a target position of an image display area, an image in a current cropping area of the cropping block based on a current size ratio of an image in the cropping area of the cropping block when the dragging event for the cropping block ends.

Based on the same inventive concept as the image cropping method shown in FIG. 8, an image cropping device is provided according to an embodiment of the disclosure. The device includes: an image adjusting module configured to adjust, when a dragging event for a cropping block is detected and the dragging event for the cropping block continues, a display position of an image in the cropping area of the cropping block to make the center of the target image approach the center of the cropping area of the cropping block based on a specified path; and an image displaying module configured to display, on a target position of an image display area, an image in a current cropping area of the cropping block based on a current size ratio of an image in the cropping area of the cropping block when the dragging event for the cropping block ends.

If a screen that the user expects to preserve is close to or located in a center region of the target image, during the image cropping process, if the display position of the target image remains unchanged, the border of the cropping block needs to be adjusted multiple times in multiple directions. If the display position of the target image is adjusted according to the device provided in the sixth aspect of the embodiments of the disclosure, it is possible to avoid missing the screen that the user expects to preserve during the image cropping process, and the expected effect can be achieved by a few adjustments in a few number of directions, and the cropping efficiency can be improved, and a complexity of the cropping operation can be reduced.

Based on the same inventive concept as the method shown in FIGS. 7 and 8, a mobile terminal is provided according to an embodiment of the disclosure. The mobile terminal includes: a memory configured to store a program for executing the method shown in FIGS. 7 and 8; and a processor configured to execute the program stored in the memory.

If a screen that the user expects to preserve is close to or located in a center region of the target image, during the image cropping process, if the display position of the target image remains unchanged, the border of the cropping block needs to be adjusted multiple times in multiple directions. If the display position of the target image is adjusted according to the mobile terminal provided in the seventh aspect of the embodiments of the disclosure, it is possible to avoid missing the screen that the user expects to preserve during the image cropping process, and the expected effect can be achieved by a few adjustments in a few number of directions, and the cropping efficiency can be improved, and a complexity of the cropping operation can be reduced.

Based on the same inventive concept as the method shown in FIGS. 7 and 8, a computer-readable storage medium is provided according to an embodiment of the disclosure. The medium stores a program for executing the method shown in FIGS. 7 and 8.

If a screen that the user expects to preserve is close to or located in a center region of the target image, during the image cropping process, if the display position of the target image remains unchanged, the border of the cropping block needs to be adjusted multiple times in multiple directions. If the display position of the target image is adjusted according to the program stored in the computer-readable storage medium provided in the eighth aspect of the embodiments of the disclosure, it is possible to avoid missing the screen that the user expects to preserve during the image cropping process, and the expected effect can be achieved by a few adjustments in a few number of directions, and the cropping efficiency can be improved, and a complexity of the cropping operation can be reduced.

It should be pointed out that the methods provided by the various embodiments of the present disclosure may be implemented by a mobile terminal, specifically by the image retouching software of the mobile terminal, or may be implemented by a PC (personal computer) or a server.

The present disclosure is described with reference to flow charts and/or block diagrams of methods, devices (systems), and computer program products according to the embodiments of the present disclosure. It should be understood that each of the flows in the flow charts and/or each of blocks in the block diagrams, and a combination of flows in the flow charts and/or a combination of blocks in the block diagrams can be implemented by the computer program instructions. The computer program instructions may be installed in a general-purpose computer, a dedicated computer, an embedded processor or processors of other programmable data processing devices to generate a machine, such that the instructions executed by the computer or the processors of the other programmable data processing devices generate a device for implementing functions specified in one or more flows of the flow charts and/or one or more blocks of the block diagrams.

The computer program instructions may be stored in a computer readable memory which may direct a computer or other programmable data processing devices to operate in a manner, such that a manufacture including an instruction device is generated based on the instructions stored in the computer readable memory, and the instructions are executed to perform functions specified in one or more flows of the flow charts and/or one or more blocks of the block diagrams.

The computer program instructions may be loaded on a computer or other programmable data processing devices. Then, the computer or other programmable devices perform operation steps to realize the processing performed by the computer, so that the instructions are executed by the computer or other programmable devices to perform functions specified in one or more flows of the flow charts and/or one or more blocks of the block diagrams.

Although the preferred embodiments of the present disclosure are described, those skilled in the art may make additional changes and modifications to the embodiments once they know the basic creative concepts. Therefore, the appended claims are intended to be explained as including the preferred embodiments and all changes and modifications falling within the scope of the present disclosure.

It is apparent that, those skilled in the art may make various changes and variations to the present disclosure without departing from the spirit and scope of the present disclosure. In this case, if the changes and variations of the present disclosure fall within the scope of the claims of the present disclosure and equivalent technologies thereof, the present disclosure is intended to include the changes and variations.

The invention claimed is:

1. An image cropping method, comprising:
adjusting a size of an image in a cropping area of a cropping block in response to determining that a border of the cropping block reaches a first target position of an image display area and a same dragging event for the cropping block continues, wherein the image in the cropping area of the cropping block is a part of a target image, and wherein the adjusting a size of an image in a cropping area of a cropping block in response to determining that a border of the cropping block reaches a first target position of an image display area and a same dragging event for the cropping block continues further comprises:
increasing or reducing the size of the image in the cropping area of the cropping block based on determining whether the border of the cropping block coincides with a boundary of the target image or not when the same dragging event for the cropping block starts;
displaying, on a second target position of the image display area, an image in a current cropping area of the same cropping block according to a current size ratio of the image in the current cropping area of the same cropping block in response to determining that the same dragging event for the same cropping block ends; and
wherein the adjusting a size of an image in a cropping area of a cropping block further comprises:
determining an image size adjustment speed based on a parameter of the same dragging event for the cropping block, and
adjusting the size of the image in the cropping area of the cropping block based on the image size adjustment speed; or
wherein the method further comprises adjusting, when the same dragging event for the cropping block continues, a display position of a target image to make a center of the target image always coincide with a center of the cropping area of the cropping block or make the center of the target image approach the center of the cropping area of the cropping block according to a specified path.

2. The method according to claim 1, wherein
the size of the image in the cropping area of the cropping block is adjusted in a case that the border of the cropping block reaches the first target position of the image display area and the same dragging event for the cropping block continues, until the same dragging event for the cropping block ends or the border of the cropping block reaches the boundary of the target image; and/or
the first target position of the image display area is any of following positions: a boundary of the image display area, and a position of the border of the cropping block on the image display area when the border of the cropping block reaches a set minimum size; and/or
the adjusting a size of an image in a cropping area of a cropping block in a case that a border of the cropping block reaches a first target position of an image display area and a same dragging event for the cropping block continues comprises: continuously adjusting a display size of the image in the cropping area of the cropping block in a case that the border of the cropping block reaches the first target position of the image display area and the same dragging event for the cropping block continues, wherein the current size ratio of the image in the cropping area of the cropping block is determined based on a current display size; or adjusting a size parameter of the image in the cropping area of the cropping block in a case that the border of the cropping block reaches the first target position of the image display area and the same dragging event for the cropping block continues, wherein the current size ratio of the image in the cropping area of the cropping block is determined based on the size parameter when the same dragging event for the cropping block ends.

3. The method according to claim 2, wherein
in a case that the border of the cropping block reaches the boundary of the image display area, the border of the cropping block does not coincide with the boundary of the target image when the same dragging event for the cropping block starts, and the same dragging event for the cropping block continues, the adjusting a size of an image in a cropping area of a cropping block comprises: reducing the size of the image in the cropping area of the cropping block;
in a case that the border of the cropping block reaches the boundary of the image display area, the border of the cropping block coincides with the boundary of the target image when the same dragging event for the cropping block starts, and the same dragging event for the cropping block continues, the adjusting a size of an image in a cropping area of a cropping block comprises: increasing the size of the image in the cropping area of the cropping block; and
in a case that the border of the cropping block reaches the set minimum size and the same dragging event for the cropping block continues, the adjusting a size of an image in a cropping area of a cropping block comprises: increasing the size of the image in the cropping area of the cropping block.

4. The method according to claim 3, wherein the size of the image in the cropping area of the cropping block is reduced to make a proportion of the image displayed in the cropping area of the cropping block in the target image increase.

5. The method according to claim 2, wherein
the adjusting a size of an image in a cropping area of a cropping block comprises: determining an image size adjustment speed based on a parameter of the same dragging event for the cropping block, and adjusting the size of the image in the cropping area of the cropping block according to the image size adjustment speed; and/or
the method further comprises: adjusting, when the same dragging event for the cropping block continues, a display position of a target image to make a center of the target image always coincide with a center of the cropping area of the cropping block or make the center of the target image approach the center of the cropping area of the cropping block according to a specified path, wherein the image in the cropping area of the cropping block is a part of the target image.

6. The method according to claim 3, wherein
the adjusting a size of an image in a cropping area of a cropping block comprises: determining an image size adjustment speed based on a parameter of the same dragging event for the cropping block, and adjusting the size of the image in the cropping area of the cropping block according to the image size adjustment speed; and/or
the method further comprises: adjusting, when the same dragging event for the cropping block continues, a display position of a target image to make a center of the target image always coincide with a center of the cropping area of the cropping block or make the center of the target image approach the center of the cropping area of the cropping block according to a specified path, wherein the image in the cropping area of the cropping block is a part of the target image.

7. The method according to claim 4, wherein
the adjusting a size of an image in a cropping area of a cropping block comprises: determining an image size adjustment speed based on a parameter of the same dragging event for the cropping block, and adjusting the size of the image in the cropping area of the cropping block according to the image size adjustment speed; and/or
the method further comprises: adjusting, when the same dragging event for the cropping block continues, a display position of a target image to make a center of the target image always coincide with a center of the cropping area of the cropping block or make the center of the target image approach the center of the cropping area of the cropping block according to a specified path, wherein the image in the cropping area of the cropping block is a part of the target image.

8. The method according to claim 1, wherein the parameter of the same dragging event for the cropping block comprises a dragging distance, wherein a greater dragging distance indicates a greater image size adjustment speed.

9. An image cropping device, comprising:
one or more processors; and
a storage device storing one or more programs,
wherein the one or more programs, when executed by the one or more processors, cause the one or more processors to perform operations comprising:
adjusting a size of an image in a cropping area of a cropping block in response to determining that a border of the cropping block reaches a first target position of an image display area and a same dragging event for the cropping block continues, wherein the image in the cropping area of the cropping block is a part of a target image, and wherein the adjusting a size of an image in a cropping area of a cropping block in response to determining that a border of the cropping block reaches a first target position of an image display area and a same dragging event for the cropping block continues further comprises:
increasing or reducing the size of the image in the cropping area of the cropping block based on determining whether the border of the cropping block coincides with a boundary of the target image or not when the same dragging event for the cropping block starts;
displaying, on a second target position of the image display area, an image in a current cropping area of the same cropping block according to a current size ratio of the image in the current cropping area of the same cropping block in response to determining that the same dragging event for the same cropping block ends; and
wherein the adjusting a size of an image in a cropping area of a cropping block further comprises:
determining an image size adjustment speed based on a parameter of the same dragging event for the cropping block, and
adjusting the size of the image in the cropping area of the cropping block based on the image size adjustment speed; or
wherein the operations further comprise adjusting, when the same dragging event for the cropping block continues, a display position of a target image to make a center of the target image always coincide with a center of the cropping area of the cropping block or make the center of the target image approach the center of the cropping area of the cropping block according to a specified path.

10. The device according to claim 9, wherein
the size of the image in the cropping area of the cropping block is adjusted in a case that the border of the cropping block reaches the first target position of the image display area and the same dragging event for the cropping block continues, until the same dragging event for the cropping block ends or the border of the cropping block reaches a boundary of a target image; and/or
the first target position of the image display area is any of following positions: a boundary of the image display area, and a position of the border of the cropping block on the image display area when the border of the cropping block reaches a set minimum size; and/or
continuously adjusting a display size of the image in the cropping area of the cropping block in a case that the border of the cropping block reaches the first target position of the image display area and the same dragging event for the cropping block continues, wherein the current size ratio of the image in the cropping area of the cropping block is determined based on a current display size; or adjusting a size parameter of the image in the cropping area of the cropping block in a case that the border of the cropping block reaches the first target position of the image display area and the same dragging event for the cropping block continues, wherein the current size ratio of the image in the cropping area of the cropping block is determined based on the size parameter when the same dragging event for the cropping block ends.

11. The device according to claim 10, wherein
in a case that the border of the cropping block reaches the boundary of the image display area, the border of the cropping block does not coincide with the boundary of the target image when the same dragging event for the cropping block starts, and the same dragging event for the cropping block continues, the adjusting a size of an image in a cropping area of a cropping block comprises: reducing the size of the image in the cropping area of the cropping block;
in a case that the border of the cropping block reaches the boundary of the image display area, the border of the cropping block coincides with the boundary of the target image when the same dragging event for the cropping block starts, and the same dragging event for the cropping block continues, the adjusting a size of an image in a cropping area of a cropping block comprises: increasing the size of the image in the cropping area of the cropping block; and
in a case that the border of the cropping block reaches the set minimum size and the same dragging event for the cropping block continues, the adjusting a size of an image in a cropping area of a cropping block comprises: increasing the size of the image in the cropping area of the cropping block.

12. The device according to claim 11, wherein the size of the image in the cropping area of the cropping block is reduced to make a proportion of the image displayed in the cropping area of the cropping block in the target image increase.

13. The device according to claim 10, wherein the one or more programs, when executed by the one or more processors, cause the one or more processors to perform operation comprising:
determining an image size adjustment speed based on a parameter of the same dragging event for the cropping block, and adjusting the size of the image in the cropping area of the cropping block according to the image size adjustment speed; and/or
adjusting, when the same dragging event for the cropping block continues, a display position of a target image to make the center of the target image always coincide with the center of the cropping area of the cropping block or make the center of the target image approach the center of the cropping area of the cropping block according to a specified path.

14. The device according to claim 11, wherein the one or more programs, when executed by the one or more processors, cause the one or more processors to perform operation comprising:
determining an image size adjustment speed based on a parameter of the same dragging event for the cropping block, and adjusting the size of the image in the cropping area of the cropping block according to the image size adjustment speed; and/or
adjusting, when the same dragging event for the cropping block continues, a display position of a target image to make the center of the target image always coincide with the center of the cropping area of the cropping block or make the center of the target image approach the center of the cropping area of the cropping block according to a specified path.

15. The device according to claim 12, wherein the one or more programs, when executed by the one or more processors, cause the one or more processors to perform operation comprising:
determining an image size adjustment speed based on a parameter of the same dragging event for the cropping block, and adjusting the size of the image in the cropping area of the cropping block according to the image size adjustment speed; and/or
adjusting, when the same dragging event for the cropping block continues, a display position of a target image to make the center of the target image always coincide with the center of the cropping area of the cropping block or make the center of the target image approach the center of the cropping area of the cropping block according to a specified path.

16. The device according to claim 9, wherein the parameter of the same dragging event for the cropping block comprises a dragging distance, wherein a greater dragging distance indicates a greater image size adjustment speed.

17. A non-transitory computer-readable storage medium, storing one or more programs for executing operations comprising:
adjusting a size of an image in a cropping area of a cropping block in response to determining that a border of the cropping block reaches a first target position of an image display area and a same dragging event for the cropping block continues, wherein the image in the cropping area of the cropping block is a part of a target image, and wherein the adjusting a size of an image in a cropping area of a cropping block in response to determining that a border of the cropping block reaches a first target position of an image display area and a same dragging event for the cropping block continues further comprises:
increasing or reducing the size of the image in the cropping area of the cropping block based on determining whether the border of the cropping block coincides with a boundary of the target image or not when the same dragging event for the cropping block starts;
displaying, on a second target position of the image display area, an image in a current cropping area of the same cropping block according to a current size ratio of the image in the current cropping area of the same cropping block in response to determining that the same dragging event for the same cropping block ends; and
wherein the adjusting a size of an image in a cropping area of a cropping block further comprises:
determining an image size adjustment speed based on a parameter of the same dragging event for the cropping block, and
adjusting the size of the image in the cropping area of the cropping block based on the image size adjustment speed; or
wherein the operations further comprise adjusting, when the same dragging event for the cropping block continues, a display position of a target image to make a center of the target image always coincide with a center of the cropping area of the cropping block or make the center of the target image approach the center of the cropping area of the cropping block according to a specified path.

* * * * *